(12) United States Patent
Schimmel

(10) Patent No.: US 12,000,417 B2
(45) Date of Patent: Jun. 4, 2024

(54) STRUCTURED GAS-CONTAINING SURFACES

(71) Applicant: Baden-Württemberg Stiftung gGmbH, Stuttgart (DE)

(72) Inventor: Thomas Schimmel, Karlsruhe (DE)

(73) Assignee: Baden-Württemberg Stiftung gGmbH, Stuttgart (DE)

( * ) Notice: Subject to any disclaimer, the term of this patent is extended or adjusted under 35 U.S.C. 154(b) by 784 days.

(21) Appl. No.: 16/982,321

(22) PCT Filed: Apr. 11, 2019

(86) PCT No.: PCT/EP2019/059294
§ 371 (c)(1),
(2) Date: Sep. 18, 2020

(87) PCT Pub. No.: WO2019/201744
PCT Pub. Date: Oct. 24, 2019

(65) Prior Publication Data
US 2021/0033119 A1 Feb. 4, 2021

(30) Foreign Application Priority Data
Apr. 17, 2018 (DE) ...................... 10 2018 003 141.2

(51) Int. Cl.
*F15D 1/00* (2006.01)
*B08B 17/06* (2006.01)
(Continued)

(52) U.S. Cl.
CPC .......... *F15D 1/0085* (2013.01); *B08B 17/065* (2013.01); *B63B 1/38* (2013.01);
(Continued)

(58) Field of Classification Search
CPC ........ F15D 1/0085; F15D 1/004; F15D 1/008; B08B 17/065; B63B 1/38; B63B 59/045
See application file for complete search history.

(56) References Cited

U.S. PATENT DOCUMENTS 4,863,121 A 9/1989 Savill
5,090,352 A * 2/1992 Stanford ................... B63B 1/06
114/61.28
(Continued)

FOREIGN PATENT DOCUMENTS

CN 201159217 Y 12/2008
CN 104271259 A 1/2015
(Continued)

OTHER PUBLICATIONS

Japanese Office Action, dated Dec. 20, 2016 for Japanese Patent Application No. 2014-559125, pp. 1-12.
(Continued)

*Primary Examiner* — David Sample
*Assistant Examiner* — Donald M Flores, Jr.
(74) *Attorney, Agent, or Firm* — McDonnell Boehnen Hulbert & Berghoff LLP

(57) ABSTRACT

The present invention relates to structured, gas-holding surfaces for improving the friction-reducing properties of gas layers held under a liquid and for the simultaneous suppression of turbulence. The present invention furthermore relates to a device comprising this structured, gas-holding surface and to the use of this structured, gas-holding surface.

18 Claims, 6 Drawing Sheets

(51) Int. Cl.
*B63B 1/38* (2006.01)
*B63B 59/04* (2006.01)

(52) U.S. Cl.
CPC .......... *B63B 59/045* (2013.01); *F15D 1/004* (2013.01); *F15D 1/008* (2013.01)

(56) References Cited

U.S. PATENT DOCUMENTS

| | | | |
|---|---|---|---|
| 5,476,056 | A | 12/1995 | Tokunaga et al. |
| 6,994,045 | B2 | 2/2006 | Paszkowski |
| 9,630,373 | B2 | 4/2017 | Schimmel |
| 10,625,833 | B2 | 4/2020 | Schimmel |
| 11,584,490 | B2 | 2/2023 | Schimmel |
| 2005/0061221 | A1* | 3/2005 | Paszkowski .......... F15D 1/0035 114/67 R |
| 2010/0131062 | A1 | 5/2010 | Andersson et al. |
| 2010/0236466 | A1 | 9/2010 | Costas |
| 2011/0259440 | A1 | 10/2011 | Kawashima et al. |
| 2015/0273791 | A1* | 10/2015 | Schimmel ............... F15D 1/008 156/60 |
| 2021/0033515 | A1 | 2/2021 | Schimmel |
| 2022/0276217 | A1 | 9/2022 | Schimmel et al. |
| 2023/0150623 | A1 | 5/2023 | Schimmel |

FOREIGN PATENT DOCUMENTS

| | | |
|---|---|---|
| DE | 3522943 C2 | 1/1987 |
| DE | 102011121796 A1 | 8/2012 |
| EP | 0 616 940 A1 | 9/1994 |
| JP | 1991-500508 A | 2/1991 |
| JP | 1995-017476 A | 1/1995 |
| JP | 2003-226867 A | 8/2003 |
| JP | 2005048904 A | 2/2005 |
| JP | 2005-507313 A | 3/2005 |
| JP | 2005507313 A | 3/2005 |
| JP | 2009247949 A | 10/2009 |
| JP | 2010155604 A | 7/2010 |
| KR | 10-2005-0042056 A | 5/2005 |
| KR | 10-2011-0133354 A | 12/2011 |
| WO | 88/07956 A1 | 10/1988 |
| WO | 89/11343 A2 | 11/1989 |
| WO | WO-02097354 A1 * | 12/2002 .......... F28D 7/0058 |
| WO | 03/037702 A1 | 5/2003 |
| WO | 2003/037702 A1 | 5/2003 |
| WO | 2012/015700 A2 | 2/2012 |
| WO | 2013/131618 A2 | 9/2013 |
| WO | 2017/115694 A1 | 6/2017 |

OTHER PUBLICATIONS

Japanese Office Action dated Nov. 27, 2018, from the Japanese Patent Office, for Japanese Patent Application No. 2017-247905, pp. 1-16.

Notice of Decision to Grant a Patent (with partial English translation), from the Korean Intellectual Property Office, for Korean Patent Application No. 10-2014-7024551, dated Jun. 27, 2019, pp. 1-6.

Korean Office Action (with English translation), from the Korean Intellectual Property Office, for Korean Patent Application No. 10-2019-7028557, dated Sep. 27, 2019, pp. 1-14.

Chinese Office Action, Application No. CN201980026256.0, dated Mar. 3, 2022, 7 pages.

IPER with Annexes, for International Application No. PCT/EP2019/059294, dated Aug. 13, 2020, pp. 1-14.

PCT International Search Report, (with English translation) from the European Patent Office, for International Application No. PCT/EP2019/059294, dated Sep. 16, 2019, pp. 1-8.

* cited by examiner

FIG 2
Elongated hexagonal compartment structure
with rib structures applied at the
top on the longitudinal sides
parallel to the flow direction  :
projecting perpendicularly upward into the water.
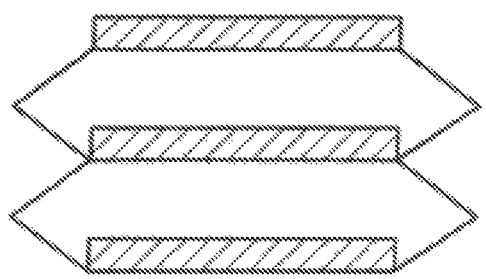

FIG 3
a)
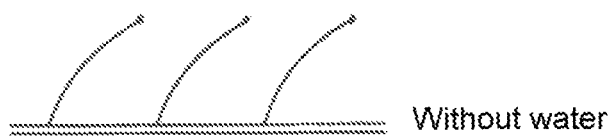
Without water
b)
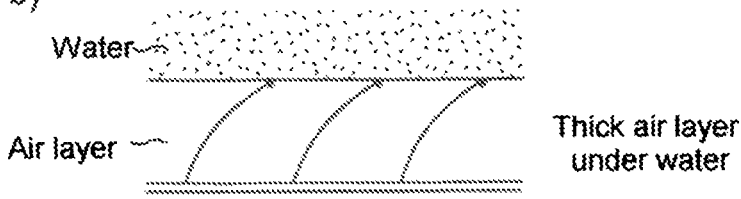
Thick air layer under water
c)
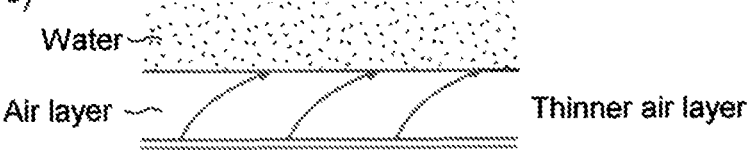
Thinner air layer
d)
Excessively thin air layer: Hairs abruptly stand up and now project into the water

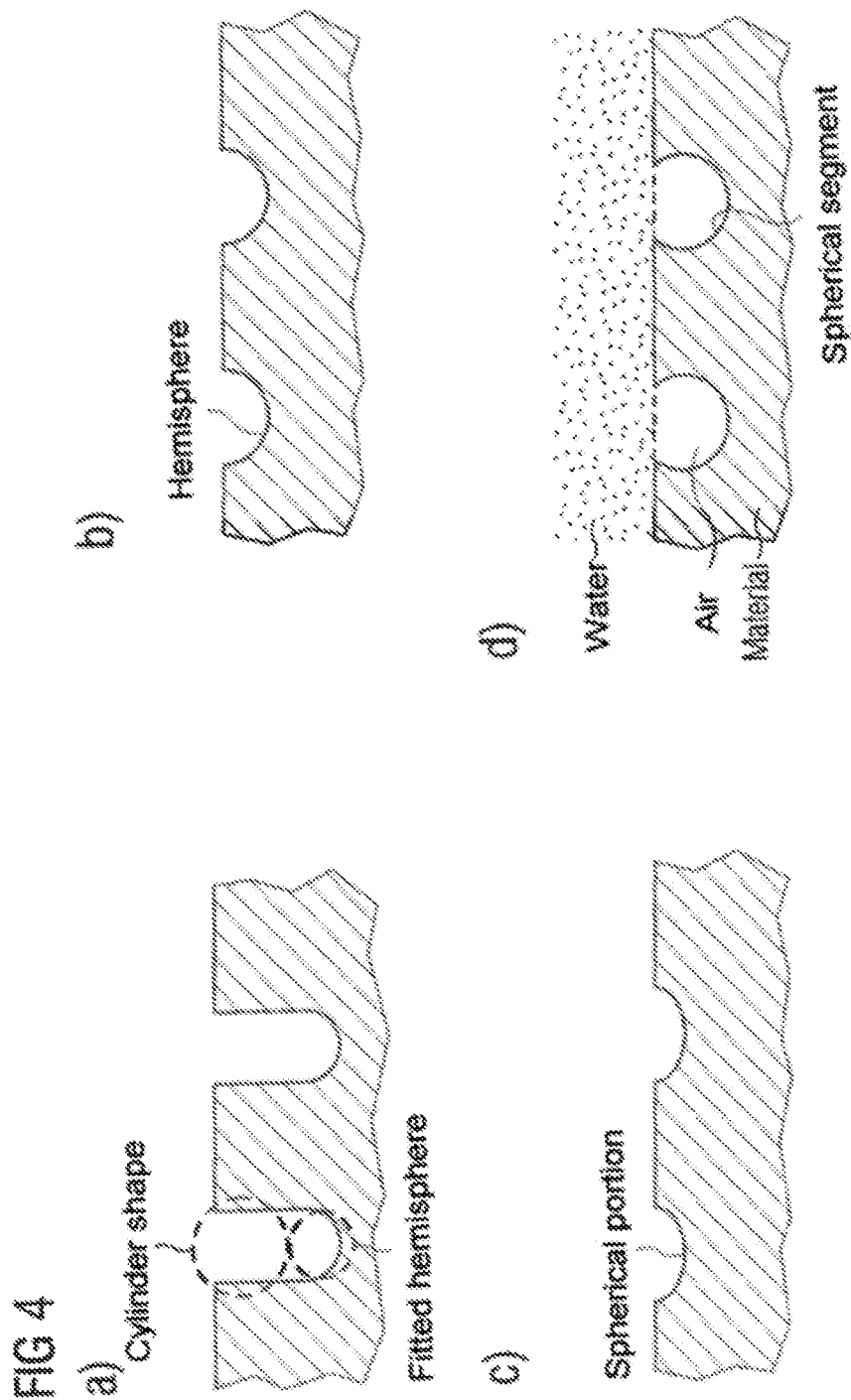

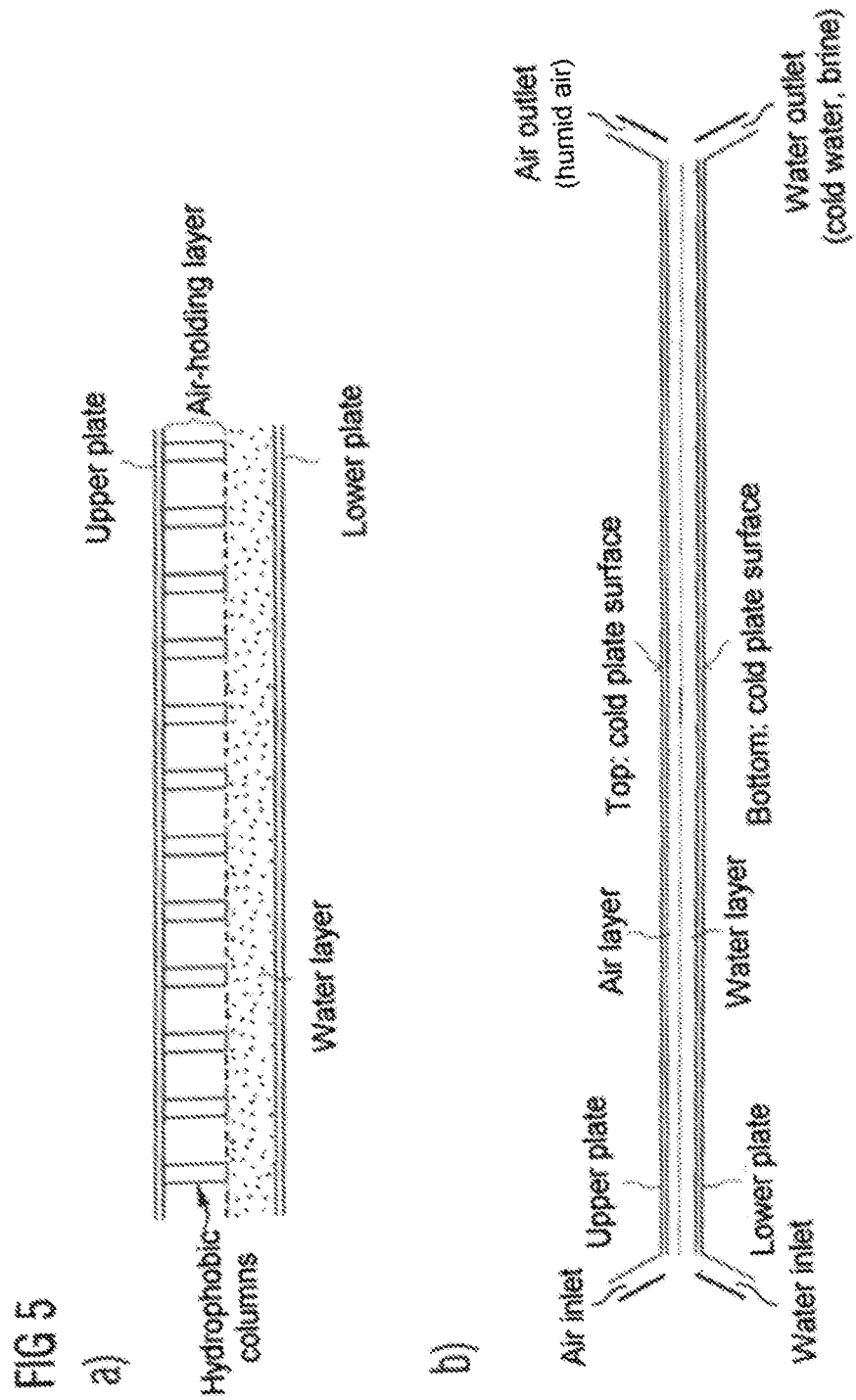

FIG 5 c)

Multilayer unit as:
- Desalinator
- Cooling unit
- Distillation apparatus
- Brine production of the various layers 1...n Each layer has:
a) Gas inlet ... respectively all a) are connected to one another
b) Gas outlet ... respectively all b) are connected to one another
c) Water inlet ... respectively all c) are connected to one another
d) Water outlet ... respectively all d) are connected to one another

```
           Plate 1
a) ─→ ─ ─ ─ ─ ─ ─ ─ ─ ─ ─ ─ Air layer ─→ b)
c) ─→    Plate 2           Water layer ─→ d)
a) ─→ ─ ─ ─ ─ ─ ─ ─ ─ ─ ─ ─ Air layer ─→ b)
c) ─→    Plate 3           Water layer ─→ d)

⋮

Plate n-1
a) ─→ ─ ─ ─ ─ ─ ─ ─ ─ ─ ─ ─ Air layer ─→ b)
c) ─→    Plate n           Water layer ─→ d)
```

STRUCTURED GAS-CONTAINING SURFACES

CROSS-REFERENCE

This application is a 371 U.S. national phase of PCT/EP2019/059294, filed Apr. 11, 2019, which claims priority from German patent application no. DE 10 2018 003 141.2, filed Apr. 17, 2018, both which are incorporated by reference in its entirety.

FIELD OF THE INVENTION

The present invention relates to structured, gas-holding surfaces for improving the friction-reducing properties of gas layers held under a liquid and for the simultaneous suppression of turbulence. The present invention furthermore relates to a device comprising this structured, gas-holding surface and to the use of this structured, gas-holding surface.

BACKGROUND OF THE INVENTION

About 90% of international trade worldwide is covered by ships. However, ships cause serious environmental damage. According to a current study, ship exhaust gases which enter the atmosphere are held responsible for up to 60 000 deaths a year. The 15 largest ships allegedly produce more sulfur dioxide ($SO_2$) than all the automobiles in the world together. Furthermore, ships release large amounts of highly toxic substances into the water in order to avoid biofouling of their underwater hull surfaces. In addition, large amounts of energy are wasted because of the friction of the hull against the water.

Three main problems with which ships are confronted relate to the fact that the hull is in contact with water. The following problems in this case arise, namely the flow resistance (also referred to as "drag"), corrosion and fouling, i.e. biological growth on the surface.

Drag—the majority of the fuel consumption of ships is attributable to friction with the surrounding water.

Corrosion—a phenomenon which is also substantially related to the fact that the ship is in direct contact with the surrounding seawater with its high salt content.

Fouling—the growth of marine organisms would not take place if the ship were surrounded by air instead of water.

In the prior art, there are various approaches for reducing the friction of ships. For example, a friction reduction may be achieved by an air layer between water and the hull. For example, WO 2013/131618 A2 describes such a gas-holding surface covering having a particular surface structure, with which inter alia a hull may be separated at least partially from the surrounding water by means of this gas-holding layer. This approach, based on a bionic coating that holds a permanent air layer on a surface under water, could solve the aforementioned problems because the covering of a hull with an air layer under water would avoid direct contact of the ship with the water. On the one hand, corrosion would be avoided since the seawater containing salt no longer comes in contact with the ship. Fouling could also be avoided in this way, since marine flora, fauna, algae and larvae do not reach the surface of the hull because of the air layer. Lastly, the air layer would act as a "lubricant layer" for the ship since the air layer has a very much lower viscosity than water. The friction with the surrounding water may thereby be reduced.

The most recent developments in the field of bionic surfaces show that it is possible to avoid direct contact between a surface and the surrounding water. With the aid of these gas-holding surfaces, this has to date even been achieved over a very long period of several years, it being possible to maintain an air layer under water in order to keep the surfaces dry even though they are kept under water. This opens up interesting perspectives in many applications, for example for ships, oil platforms, water pipelines and contamination-free water containers.

The aforementioned method for reducing friction, for example of ships, by using structured surfaces that hold air under water, very effectively makes it possible to reduce the friction between the water and the surface moved relative to the water, since the air layer has a significantly lower viscosity than the water.

Even before the use of air layers to reduce friction relative to water, there were successful approaches for reducing the friction of ships by reducing turbulence. To this end, in particular, very fine longitudinal grooves on the submillimeter scale and on the micrometer scale were used, which are oriented parallel to the flow, i.e. to the direction of the relative velocity between the surface, for example a ship surface, and the water (or generally the liquid) and which, at least in the immediate vicinity of the surface, therefore suppress any flow components transversely with respect to the movement direction, which occur in particular because of turbulence (formation of small vortices). With the so-called shark skin effect, the idea is to suppress turbulence in the so-called boundary layer in the immediate vicinity of the surface by bionic structures based on the surface structure of shark skin. By fine ribs, so-called riblets, which usually have a sharp-edged rib tip and whose heights and rib spacings are usually in the range of a few tens of µm, the momentum transfer transversely with respect to the flow direction, caused by vortices in turbulent flow, is prevented, which according to literature data leads to a friction reduction of up to 10% in theory and up to 8% in practice.

However, such measures, which likewise require a structured surface, lead to no change in the viscosity of the medium (as is induced by the introduction of a layer of low-viscosity air), no avoidance of fouling by avoiding contact between the surface and the water (as is induced by an air layer between the water and the surface), and no avoidance of corrosion by avoiding contact between the surface and the water (as is likewise induced by an air layer between the water and the surface).

One significant disadvantage of the use of longitudinal grooves is, however, that it is not possible to avoid fouling, for which reason the friction-reducing effect is only temporarily observable.

Another approach has been and is being technically followed, namely the generation of fine air bubbles in water in the immediate vicinity of the ship's side (so-called air microbubble technology). This approach does in fact lead to an effective viscosity change of the medium, albeit much less than the use of an air layer between the water and a (ship) surface: the water "diluted" with small air bubbles has a lower effective viscosity than pure water without the air bubbles. This method, however, has the great disadvantage that it requires special devices which generate fine air bubbles under the ship, or in the immediate vicinity of the ship. Because of the high surface tension of water, the generation of the air bubbles requires a large amount of energy. Added to this, with a decreasing radius r of the air bubbles, the pressure inside the air bubbles increases proportionally to 1/r, which additionally costs energy. The main disadvantage, however, is that the air bubbles rise upward to the surface of the water because of the buoyancy in water and therefore disappear from the water, so that the compressors constantly have to generate new air bubbles and the energy saving is then reduced to the difference between the energy saving due to friction reduction and the energy expended for generating the air bubbles.

However, although these measures, which do not require a structured surface but do require a device for continuous uninterrupted generation of the air bubbles, do lead to a change in the effective viscosity of the medium (albeit very much less than is induced by the introduction of a layer of low-viscosity air), they do not lead to avoidance of fouling by avoiding contact between the surface and the water (as is induced by an air layer between the water and the surface), and they do not lead to avoidance of corrosion by avoiding contact between the surface and the water (as is likewise induced by an air layer between the water and the surface).

In summary, it may be stated regarding the substantial difference between air microbubble technology and permanent air layers under water that:

permanent air layers under water lead to the water not touching the ship. The ship remains dry.

air microbubble technology, on the other hand, leads to the air not touching the ship. The ship remains wet.

A disadvantage of air microbubble technology is naturally that it requires constant uninterrupted re-pumping of air through a compressor. On the other hand, this fact also makes it tolerant to air loss, which inherently exists in the system anyway with this technology. In the coating of ships or other surfaces under water or another liquid, in the event of an air loss from the layer suitable measures must first be taken to regenerate the air layer.

SUMMARY OF THE INVENTION

The present invention relates to structured, gas-holding surfaces for improving the friction-reducing properties of gas layers held under a liquid and for the simultaneous suppression of turbulence. The present invention furthermore relates to a device comprising this structured, gas-holding surface and to the use of this structured, gas-holding surface and method of use.

The object of the present invention is therefore to provide a new approach for further improvement of the friction-reducing properties of surfaces which are in contact or are intended to be brought in contact with a liquid.

This object is achieved by the embodiments of the present invention which are characterized in the claims.

DESCRIPTION OF THE DRAWINGS

The present invention will be explained in more detail below together with the figures. In the figures:

FIG. 2 shows an elongated hexagonal compartment structure having rib structures applied at the top on the longitudinal sides parallel to the flow direction, which are arranged projecting perpendicularly upward into the water.

FIGS. 3(a)-3(d) show the principle of the air trap structures in the event of an air loss, FIG. 3(a) being a representation without water, FIG. 3(b) representing a "thick" (i.e. filled) air layer under water, FIG. 3(c) representing a "thinner" air layer in comparison with FIG. 3(b) under water, and FIG. 3(d) representing the state of an excessively thin air layer in which the hairs abruptly stand up and now project into the water.

FIGS. 4(a) to 4(d) show examples of rounded internal configurations of the compartments.

FIGS. 5(a) to 5(c) show the principle of a desalinator, cooling unit, distillation apparatus and heat exchanger.

DETAILED DESCRIPTION OF THE INVENTION

Figure 1:
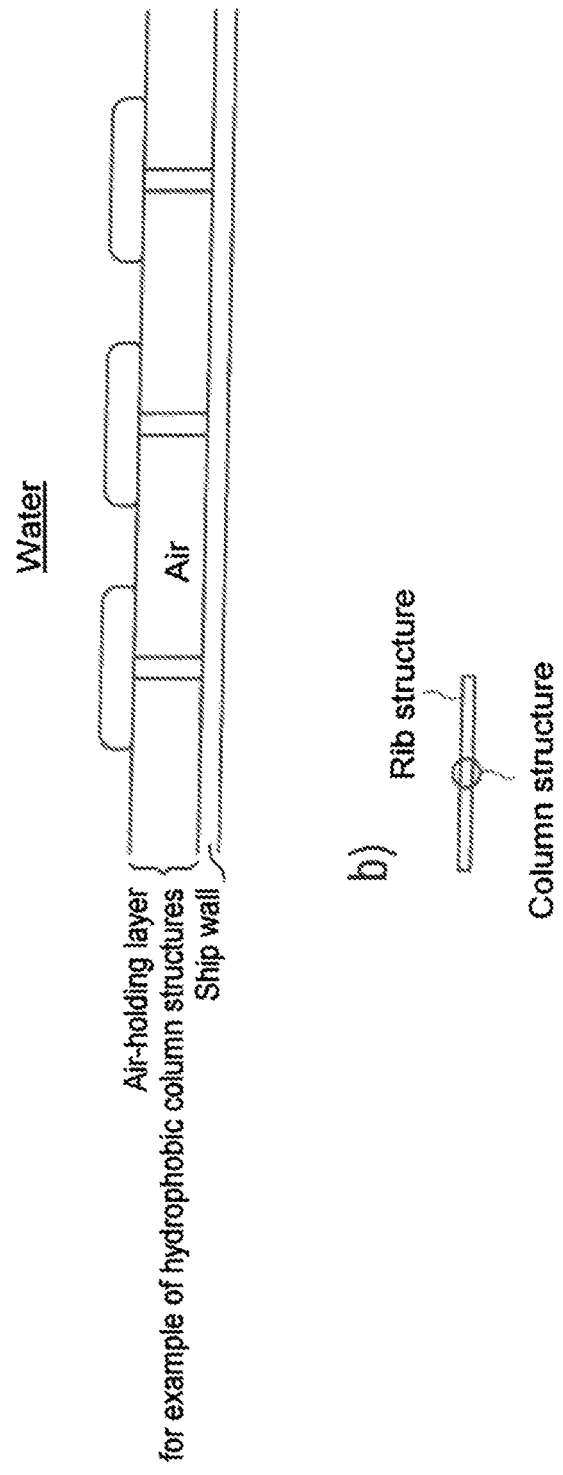
FIGS. 1(a) and 1(b) shows rib structures on column structures, FIG. 1(a) representing a side view and FIG. 1(b) representing a top view of an individual structure.

In particular, the invention provides a structured surface, which at least partially comprises structures that repel a liquid and which under liquid at least temporarily holds or can hold a gas layer, characterized in that the structured surface additionally comprises projecting longitudinal structures parallel to the flow direction of the liquid, or parallel to the movement direction of the structured surface relative to the liquid, which project at least temporarily by from 0.1 µm to 10 mm from the gas layer and into the liquid.

Because of this specific configuration of the structured surface according to the invention, the friction with the liquid can be reduced significantly because of the gas-holding layer, since the viscosity in the held gas layer is significantly less than that of the liquid, for example in the form of water. Since the structured surface according to the invention comprises suitable projecting longitudinal structures in addition to this surface structure, a suppression or reduction of turbulence may additionally be achieved, which increases the friction-reducing effect of the surface even further without losing the antifouling effect and the anticorrosive effect of the gas layer.

These longitudinal structures, which are oriented substantially parallel to the flow direction (the flow direction meaning the direction of the relative movement between the surface and the surrounding liquid), are configured in a similar way to the aforementioned riblet structures and preferably end with a sharp edge, i.e. with an edge whose radius of curvature is substantially less than the width and the height of the structure, ideally at least a factor of 10 less.

According to the present invention the liquid which is in contact, at least in regions, with the structured surface is any liquid. Preferably, the liquid is water, in particular freshwater or seawater, or an aqueous solution. Furthermore, the liquid may also contain alcohols, alkanes, oils, polar and nonpolar solvents, without being restricted thereto. When "water" is referred to below, this also includes the aforementioned liquids.

The gas held in the gas-holding layer may for example be air, nitrogen, argon, helium, carbon dioxide or another gas; air, nitrogen, argon and helium are preferred. When "air" is referred to below, this also includes the aforementioned gases.

According to the invention, four advantageous configurations (i) to (iv) are to be mentioned in particular, which may also be combined with one another:

(i) The riblet structures (sometimes also referred to below as rib structures), which form compartment walls of the individual compartments, i.e. the cells, as will be described in more detail below, which contain the gas under liquid, are configured at their upper ends in such a way that they at least temporarily and at least partially project into the liquid (for example water), specifically with the part of the compartment walls which is oriented parallel to the flow. In the case of one of the preferred compartment shapes, the elongated hexagonal shape, in which the individual mutually separated gas-holding compartments respectively have, as seen from above, the shape of an asymmetrical hexagon in which the longer sides are oriented parallel to the flow direction, the rib structures may be integrated very easily: the long compartment sides are simply increased upward so that they project at least temporarily and at least partially into the liquid, and in a preferred configuration they are terminated upward with a sharp edge.

(ii) The rib structures according to (i) may now be configured fully or partially with a hydrophilic surface, so that the contact area of the water with the hydrophilic contact area at the edge of the compartment, now increased substantially by the existence of the rib structures projecting into the water, improves the air-holding property and substantially increases the necessary reduced pressure which is required in order to extract the air from the compartments (pinning riblets). When they have a fully or partially hydrophilic surface, the rib structures therefore fulfill a twofold purpose: on the one hand they are used to suppress turbulence, and on the other hand they increase the pinning force with which the cell walls bind the water at the upper end of the cell wall and thus prevent escape of the air from the cells (which are internally coated so as to be hydrophobic, i.e. water-repellent and which are hydrophilic only at their upper edge and in the region of the rib structures which continues outward into the water).

(iii) The rib structures according to (i) may also be configured fully or partially with a hydrophobic, i.e. water-repellent, surface, and may therefore be used simultaneously as structures for trapping small air bubbles from the water. If, for instance in the case of ships, the ribs are formed longitudinally with respect to the flow direction and the small air bubbles move from the bottom upward in the water during their ascent due to buoyancy in the water, they move perpendicularly to the rib structures and may thus remain thereon and be trapped by them. This is already possible in the case of hydrophilic rib structures. The effect of the air bubble trapping is, however, enhanced even more substantially by configuration in the form of rib structures in which at least the region of the outer edge is hydrophobic, i.e. water-repellent, since the displacement of the water at the surface of the rib structure by the air then offers a further additional energetic advantage. The air bubbles that need to be generated therefor in this case have a diameter which preferably corresponds to that of the height or that of the spacing of the rib structures. In one preferred configuration variant, this is the range between 0.1 µm and 1 mm, particularly preferably the range between 5 µm and 500 µm, both for the height of the rib structures and for the spacing of neighboring rib structures.

(iv) The variant (ii) of the "pinning riblets" with its fully or partially hydrophilic surface may, however, be used advantageously entirely without an underlying air-holding surface: even in the case of the pure riblet surface, as is for example based on a bionic use of the shark skin, the turbulence suppression is commensurately more effective when turbulence is suppressed transversely with respect to the flow direction. In this case, the variant of configuring the region close to the upper edges of longitudinal ribs or riblets to be hydrophilic on an otherwise hydrophobic surface having these longitudinal ribs is recommendable in particular.

The gas-holding layer, which is formed by the liquid-repellent structures, is configured in such a way that, during the intended use of the structured surface according to the invention, a gas is held by the gas-holding layer. In this way, a body on which the structured surface according to the invention is applied is separated at least partially, preferably fully, from the liquid by the gas. The gas which is held by the gas-holding layer is fixed by the gas-holding layer in such a way that it advantageously neither rises to the liquid surface nor is entrained by a liquid flow.

According to the present invention, the gas-holding layer may be configured like the gas-holding surface covering described in WO 2013/131618 A2, to which full reference is made.

In particular, the gas-holding layer comprises projections or protruding elements at least in regions on the side facing toward the liquid, the surface of the gas-holding layer comprising a surface that repels the liquid at least in the region of the projections or protruding elements. Expediently, the distance between the protruding elements is dimensioned in such a way that no liquid drops can be arranged between the protruding elements. Advantageously, the individual drops of liquid are carried by a multiplicity of protruding elements, so that the interface between the liquid and the gas lying between the protruding elements is substantially formed as an envelope of the protruding elements. In particular, the distance between two neighboring protruding elements may be from about 50 µm to about 500 µm, preferably from about 100 µm to about 200 µm.

Preferably, the gas-holding layer is subdivided by fluid-impermeable separating walls into a multiplicity of self-contained subregions (also referred to as compartments). Preferably, the separating walls are preferably configured to be hydrophilic at least in regions or fully, or are provided at least in regions or fully with a hydrophilic surface. According to the invention, a fluid is intended to mean a gas, a liquid and a mixture thereof. The separating wall consequently prevents a liquid flow or a gas flow being formed between neighboring subregions. Advantageously, in the event of a pressure difference between two neighboring subregions, the separating walls prevent gas flowing away from one subregion to the neighboring subregion and the flow resistance in relation to a liquid in contact thereby being locally increased, and in contrast thereto excess gas being released into the liquid from the subregion into which the gas flows.

Preferably, the separating walls may be configured in one piece, or integrally, with the further elements of the gas-holding layer. Furthermore preferably, there are a multiplicity of hydrophobic protruding elements in a two-dimensional arrangement in each of the subregions of the gas-holding layer.

Apart from the compartments, the projections or protruding elements preferably comprise a central surface region which is hydrophilic and is surrounded by a hydrophobic surface region of the projections or protruding elements. Advantageously, the interface between the liquid and the gas is localized on the regions which are configured to be hydrophilic. In this way, furthermore advantageously, detachment of gas bubbles by a flow of the liquid is avoided. This local establishment of the gas-liquid boundary is also referred to as pinning, so that the hydrophilic surface regions may also be referred to as pinning centers.

Accordingly, the structured surface according to the invention preferably comprises the above-described compartments or the above-described pinning centers. Particularly preferably, the structured surface according to the invention may comprise the above-described compartments in combination with the above-described pinning centers.

That is to say, the aforementioned problems may be solved according to the present invention in that, starting from the principle of holding gas under water by suitable structured surfaces, the structures that hold the gas are modified in such a way that, by configuring the gas-holding structured surfaces with suitable longitudinal structures, not only does the gas further reduce the friction as a low-viscosity friction-reducing "lubrication film", but the additionally introduced or by suitable modification and shaping of the compartment walls and of the hydrophilic pinning centers in the form of longitudinal structures turbulence in the immediate surface vicinity is additionally suppressed.

One existing problem of the division of the air-holding layer into individual compartments is that although they hold the air for years under water, if under extreme external influences (strong turbulence, high excess pressure, etc.) water ever enters the compartments, if materials with only moderately hydrophobic surfaces are selected, residues of the water ("water nests") remain in the corners of the compartments even if the layers are subsequently brought back into air. The problem may be solved by, for the compartment inner surfaces, using materials with a very large contact angle for water, i.e. very hydrophobic, ideally superhydrophobic materials or at least very hydrophobic or ideally superhydrophobic surfaces for the inner lining of the compartments. This is possible, but usually represents a rather cost-intensive variant. Furthermore, many technically interesting materials, and in particular technical silicones, have hydrophobic, but not superhydrophobic surfaces and a subsequent superhydrophobic coating not only entails costs but must first have its long-term stability demonstrated in time-consuming and expensive long-term tests.

In the configuration according to the invention proposed here, this problem is solved by changing not the materials but the shape of the structures. Water nests are formed when it is energetically more advantageous for the water to nestle in the corners of a compartment than to form as a substantially spherical droplet. The formation of water nests is therefore prevented by minimizing the energy which is liberated upon contact of the water with the inner surface of a compartment. Interfacial energy is the product of the interfacial energy per square micrometer by the number of square micrometers in which the water touches the surface. The first factor is minimized by the selection of a superhydrophobic surface, and the latter by the selection of a surface having the smallest possible radius of curvature. The water nests are formed precisely where the radius of curvature is the smallest, i.e. at the sharp-edged corners on the lower side of the compartments, and not even just there: they are only observed when three such edges meet at a corner. The object of the surface structure according to the invention is therefore to avoid sharp edges and corners inside the air-holding compartments and to maximize the radius of curvature, or more precisely to keep the minimum radius of curvature occurring in the compartments as large as possible. In practical configuration, this means the use of radii of curvature that preferably do not fall below 10% of the length and 10% of the width of the compartment. This applies only to the interior of the compartments, and not to their upper edge, which is intended to exert the greatest possible attraction force on water (pinning) and for which sharp edges are expressly desired. This also expressly does not apply to the rib or riblet structures, for which a sharp edge at the upper end is likewise expressly desired, but rather it applies only to the air-holding interior of the compartments.

The following are advantageous configurations of the shape of the compartments:

Compartments in hemispherical shape (concave, inwardly curved), as shown in FIG. 4(b);

compartments in the form of an inwardly curved spherical portion or spherical cap as shown in FIG. 4(c);

compartments in the form of a cylinder which is terminated at the bottom by a hemisphere (preferably) or a spherical portion, as shown in FIG. 4(a);

compartments in the form of a spherical segment (or with more than 50% of a sphere and therefore an upper opening that is to a lesser extent smaller than the maximum internal width of the cavity), as shown in FIG. 4(d).

The arrangement of such compartments to form a hexagonal or two-dimensional hexagonal close pack is preferred, in the latter case with remaining webs of less than 20% of the compartment diameter. The compartments therefore preferably have a hexagonal shape and particularly preferably an elongated hexagonal shape, as represented in FIG. 2. The following are further advantageous configurations of the shape of the compartments:

compartments in a hexagonal or elongated hexagonal shape (at the upper end facing toward the water), the internal shape of which is configured in such a way that the corners on the lower side of the compartment are avoided and replaced by rounding. In the case of meltable materials, for instance in the case of thermoplastic polymers, this is technically easy to achieve by slight melting of the lower side.

compartments in a hexagonal or elongated hexagonal shape (at the upper end facing toward the water), the internal shape of which is configured in such a way that the corners on the lower side of the compartment are avoided and the shape is optimized in such a way that the compartments (i) have a hexagonal or elongated hexagonal shape, and are open, on the upper side, (ii) are closed on the lower side, and (iii) the shape is selected in such a way that the minimum radius of curvature occurring reaches the maximum possible under these constraints, or approaches it (preferably to within 10%).

The gas held in the gas-holding layer may for example be air, nitrogen, argon, helium, carbon dioxide or another gas; air, nitrogen, argon and helium are preferred. The gas is particularly preferably air or an air mixture with nitrogen, argon and/or helium.

Because of this gas-holding layer of the surface according to the invention, in which a gas layer is held at least temporarily under liquid, besides the friction reduction it is also possible to solve the other three problems described above, namely an effect against fouling, i.e. against biological growth on the surface, the effect against corrosion and the prevention of the release of toxins from the ship paint (when the water no longer touches the ship surface, no water-soluble toxin can enter the water from the ship surface).

However, this held gas layer does not contribute, or contributes only indirectly by reducing the interaction forces, for example between the ship and the water, to reducing the formation of turbulence. If these were zero, this would also avoid turbulence. The sole use of an air layers held under water is not, however, a direct measure to reduce turbulence.

According to the present invention, the structured surface therefore additionally comprises projecting longitudinal structures parallel to the flow direction of the liquid, or parallel to the movement direction of the structured surface relative to the liquid, in order to suppress or reduce turbulence, which project at least temporarily by from 0.1 μm to 10 mm from the gas layer and into the liquid. These additional projecting longitudinal structures are preferably configured in such a way that they project from the gas layer on the micrometer scale, i.e. from 0.1 µm to 100 µm, or on the millimeter scale, i.e. from 0.1 mm to 10 mm. These longitudinal structures particularly preferably project by at least 1 µm, more preferably at least 5 µm, and particularly preferably at least 10 µm therefrom.

In this way, a suppression or reduction of turbulence may additionally be achieved, which increases the friction-reducing effect of the surface even further, without losing the antifouling effect and the anticorrosive effect of the gas layer, as is the case in the prior art.

The shape of these longitudinal structures or rib structures may be configured differently, and may for example have the cross section of a rectangle, a triangle or a trapezoid. In each case, it is advantageous for the structures to have the greatest possible extent in the longitudinal direction and to converge upward acutely with a radius of curvature of the edge in the range of from 0.1 µm to 10 µm, particularly preferably between 1 µm and 8 µm.

In one advantageous configuration, such a rib structure oriented parallel to the flow or substantially parallel to the flow lies on top of each of the hydrophobic column structures that span the air-holding layer. This is shown by way of example in FIGS. 1(a) and 1(b). There are a plurality of configuration variants in this case:

(i) The simple column structure or hair, which repel the water by their hydrophobic or superhydrophobic column surface and contribute to holding the air layer under water.

(ii) Hydrophobic column structure with a hydrophilic end (pinning center) according to the Salvinia effect.

(iii) Both are configuration possibilities that are already described. What is new according to the present invention is to place a rib structure on the upper end of each individual hydrophobic column structure with or without a hydrophilic end, which structure permanently or temporarily projects fully or partially from the air-holding layer, projects into the water, is oriented in the flow direction, is significantly longer in this direction than in the other two dimensions (preferably by a factor of from 2 to 200, particularly preferably by a factor of from 5 to 20), and preferably ends at the top with a sharp edge. As an alternative, instead of on each column structure, such a rib structure may naturally be placed only on every second etc. column structure.

(iv) In case (iii), the rib structure may also be configured with a hydrophilic surface, so that the rib structure either enhances or even replaces the hydrophilic pinning center at the upper end of the column.

According to one preferred embodiment of the present invention, the structured surface is combined with a device that, under liquid, generates gas bubbles which are generated close to the gas layer, held under liquid, of the structured surface or which, when they rise from the liquid, come close to this gas layer or partially come in contact therewith.

This device for generating the gas bubbles is not particularly restricted, and may be configured in the form of devices known in the prior art. This device is preferably of such a configuration that the gas bubbles generated have a diameter of from 10 µm to 10 mm, particularly preferably from 10 µm to 1 mm, in particular from 10 µm to 100 µm.

The combination with "air microbubble technology", i.e. the generation of fine gas or air bubbles, for example under a ship or in the immediate vicinity of the ship's side, may achieve the friction reduction by the gas or air layer with the additional friction reduction by the water being diluted with gas or air bubbles in the immediate vicinity of the surface in friction with the water.

The material of which the structured surface consists may be selected according to the application of the surface according to the invention. Preferably, however, a polymer material with which the structured surface is made is used.

According to one preferred embodiment of the present invention, the material of the structured surface contains at least one of the list consisting of silicones, silicone-based polymers and acrylic-based polymers. The additional protruding longitudinal structures may in this case be made from the same material as the gas-holding layer of the structured surface itself.

Preferably, however, the protruding longitudinal structures consist of a different material than the structured surface itself. In particular, ceramic materials, oxides, metals or steel are suitable.

According to another preferred embodiment of the present invention, the longitudinal structures are not rigidly connected to the underlying structured surface. Instead, they are preferably configured to be flexible and mobile. At least, the protruding longitudinal structures may be connected resiliently to the underlying structured surface.

As described above, the structured surface is preferably combined with a device that generates gas bubbles under liquid. According to the invention, the structured surface is capable of trapping the gas from the gas bubbles moving past and in this way of supplying itself with gas or replenishing lost gas.

In this configuration, the structured surface may comprise additional second structures protruding from the gas layer, which project into the liquid. By these additional second structures, the gas from the gas bubbles moving past may be trapped so as to supply the gas layer with gas or replenish lost gas.

In this case, structures in the shape of hairs, hairs becoming thinner upward, columns or webs are preferably used. That is to say, the protruding second structures for the purpose of trapping air from the gas bubbles are provided in addition to the actually protruding structures for suppressing or reducing turbulence, which are arranged parallel to the flow direction of the liquid, or parallel to the movement direction of the structured surface relative to the liquid.

According to a further preferred embodiment of the present invention, the second structures protruding from the gas layer simultaneously constitute the longitudinal structures that are used to trap the air bubbles (see FIGS. 3(a) to 3(d)).

According to a further preferred embodiment of the present invention, the structured surface is characterized in that the second structures protruding from the gas layer are resilient and stand upright in the absence of external forces, and they are additionally configured fully or partially by the wettability of their surface, at least in the part projecting into the liquid, in such a way that they have liquid-repellent properties, the resilient properties being adjusted in such a way that, in the event of partial or full loss of the gas layer, the structures automatically stand upright and project into the liquid, where because of their liquid-repellent layers they can trap gas bubbles which replenish the gas layer, and in such a way that as soon as a gas layer has been formed again, they are folded back into the gas layer because of their resilient properties and their liquid-repellent properties. This means that the second structures protruding from the gas layer transition from an upright state without a gas layer to that at a more shallowly inclined angle, at which they no longer project into the liquid or project only to a substantially smaller extent than before. Only in the event of a gas loss do they stand up again.

It is furthermore preferred that the second structures protruding from the gas layer are oriented, with respect to the flow direction of the liquid or the movement direction of the structured surface relative to the liquid, in such a way that they point obliquely rearward relative to the flow direction and/or are curved inward in this direction (see FIGS. 3(a)-3(d)).

In the above-described combination with air microbubble technology, there are various possibilities for the configuration of the air-holding layers. In the simplest case, the air-holding layer existing under water is combined with a generator of gas bubbles (for example a compressor plus a delivery nozzle), and the ideally outwardly inclined surface, for example of a ship that becomes wider upward, comes in direct contact with the ascending gas bubbles, which are then integrated into the gas layer because of the surface tension. This is a process that takes place spontaneously with energy being released. A horizontally or almost horizontally extending surface, for example (depending on the hull shape of the ship) the bottom of the ship, may come directly in contact with the gas bubbles generated under the hull. Particularly in the latter case, there is no restriction regarding the size of the gas bubbles. The gas bubble disintegrates in the air layer as soon as it comes in direct contact therewith.

If the air bubbles ascend on a vertical or almost vertical wall, the situation is more difficult. The gas bubbles may ascend parallel to the wall without coming in contact with the air-holding layer on the wall surface. No integration of the gas from the gas bubbles into the air layer therefore takes place, and replenishment which is desired in the event of an air loss does not take place. Assistance is then provided by hairs, nets, disk-shaped or groove-shaped structures or other structures, preferably with a hydrophobic coating, which project from the surface and into the water and which trap the ascending air bubbles and, with suitable shaping (preferably by feeding obliquely upward onto the ship's side and therefore channeling the air of the trapped bubbles directly into the air layer), trap the air bubbles and feed them to the air layer.

In one advantageous configuration, the trapping is carried out by hydrophobic, resilient structures (hairs, nets, ribs) that stand upright in air (without any water), which are integrated into the layer holding air under water and, because of their length and their attitude angle relative to the surface, which is intended to be shallower than 90°, i.e. shallower than a right angle, initially project from the structured air-holding layer, as is schematically represented in FIG. 3(a). If this layer is now brought under water, since they are hydrophobic, these hairs will try to avoid contact with the water and, since they are resilient, fold down and be integrated into the air layer at any shallower angle, as is represented in FIG. 3(b). If the air layer under water now becomes increasingly thinner in the event of an air loss, the hairs must incline further and further in order to remain in the air layer (see FIG. 3(c)). With increasing bending of the hairs, according to Hooke's law increasingly stronger restoring forces act, which attempt to raise the hair back up and, below a particular air layer thickness, i.e. beyond particular bending of the hair, these restoring forces overcome the capillary forces that hold the hydrophobic hair in the air layer. The hair stands upright, projects into the water and can now collect air bubbles which replenish the layer, as is schematically represented in FIG. 3(d).

The advantage in this case is that, when the air layer is supplied and is sufficiently thick, these air-trapping structures do not project into the water and therefore do not contribute to increasing the flow resistance. Only in the event of an air loss, when the air layer becomes too thin, do the hairs unfold and trap air bubbles. By means of the resilient properties of the structures (directly adjustable by means of shaping and thickness in the case of hairs), it is possible to adjust the air layer thickness at which the hairs unfold.

The great additional advantage of the combination is that all four effects can be achieved, i.e. (i) the effect of the gas or air layer under water, (ii) the effect of directed structures to avoid or suppress turbulence in the vicinity of the ship surface or another surface and (iii) the effect of reducing the friction by introducing gas or air bubbles, as well as (iv) the continuous or intermittent generation of gas or air bubbles in combination with structured gas-holding surfaces, the structures of which are configured in such a way that they make it possible to trap gas bubbles from the water in the event of a gas loss. Thus, in one configuration according to the invention of the gas-holding surfaces, in the event of a gas or air loss from the layer, gas or air bubbles may again be trapped which regenerate the gas or air layer again. Even if in an extreme case, under adverse conditions, the gas or air layer has for example already been losing gas or air for one hour, compressors for generating the gas or air bubbles would in theory only need to run for about one minute every hour in order, by means of trapping the gas or air bubbles in the structured gas-holding surface, to replenish the latter with gas or air. The energy expenditure for the compressors would thus be a factor of 60 lower and their lifetime and the service intervals would be correspondingly longer. In addition, there would naturally furthermore be the possibility of letting the compressors for generating the air bubbles run continuously in order to use both friction reduction effects simultaneously.

All four effects, (i) the effect of the gas or air layer under water, (ii) the effect of directed structures to avoid or suppress turbulence in the vicinity of the ship surface or another surface and (iii) the effect of reducing the friction by introducing gas or air bubbles, as well as (iv) the continuous or intermittent generation of gas or air bubbles in combination with structured gas-holding surfaces, the structures of which are configured in such a way that they make it possible to trap gas or air bubbles from the water in the event of a gas or air loss, may in this case be combined in any desired way.

The structured surface according to the invention may be used in many different fields of application in which it is important to avoid direct contact of the liquid with a surface by a separating gas or air layer. For example, the structured surface according to the invention may be used particularly in the following fields:

air coating of sea vessels to reduce friction, to avoid biofouling and to avoid corrosion by air coating;
inland navigation;
marine measurement technology;
offshore platforms, drilling islands, underwater construction;
offshore wind parks;
water pipelines and general pipelines for transporting liquids;
long-distance heating systems;
hygienic food storage without biofilm formation on the walls, for example for storage and transport of liquid foodstuffs, for instance juices;
hygienic drinking water storage without development of biofilms;
chemical systems engineering and reactors;

In a further aspect, the present invention relates to a device comprising at least one of the surfaces according to the invention, which is arranged between two plates and thereby forms a water layer and an air layer between the plates. This may be done in the form of a stack in which at least two structured surfaces, in which gas layers and liquid layers alternate, are arranged above one another. This is advantageous in particular when large liquid surfaces are desired, for example in order to evaporate large amounts of liquid per unit time.

Three applications may be mentioned in this case:

(i) Obtaining drinking water by distillation, i.e. evaporation of water and subsequent condensation thereof, particularly in sun-rich regions (for example in deserts) where the sun is available virtually without limit and without cost. The technical problem consists in the compact provision of very large water surfaces, with which—particularly in direct sunlight and heating thereby taking place (particularly when the object is configured to absorb light and infrared radiation, for instance by a matt black coloration)—it is possible to evaporate large amounts of water per unit time, which may subsequently be recondensed for use as desalinated water, for example in the field of drinking water.

(ii) Cooling objects by evaporation cooling. The only purpose of the cooling towers of power plants is cooling, above all by evaporation of water. This is an extremely effective cooling method, since water has a very high enthalpy of vaporization (heat energy required per kilogram of water) because of its hydrogen bonds between the individual molecules. The cooling towers of power plants are only as large as they are because it is necessary to provide large areas so that sufficient water per unit time evaporates in order to achieve the required cooling power. The problem to be solved, in order to make cooling units that operate according to the evaporation principle (these are not only the cooling towers of power plants) more compact, is to provide a water area that is as large as possible in a compact space.

(iii) In the distillation of liquid mixtures, for example in the chemical industry or in the concentration of alcohol in water-alcohol mixtures, the more volatile liquid is also concentrated in the evaporated and recondensed phase. Instead of Erlenmeyer flasks and Bunsen burners, economical and highly efficient technical distillation methods require systems having very large liquid-gas interfaces in a compact volume.

These technical problems are solved by the present invention by using surfaces that hold gas under liquid. In this case, however, gas-permeable connections are preferably established between the individual compartments, or the compartments are omitted and only the structured hydrophobic surfaces ensure continuous gas-holding layers under liquid. The liquid itself likewise forms a layer, as is schematically shown in FIGS. 5(a) to 5(c). In one embodiment variant, for instance, a glass or metal or plastic plate is used as an upper covering, onto which the structure holding air under water is applied, for example with an air layer of thickness between 0.1 mm and 5 mm, given by the height of the hydrophobic or superhydrophobic column structures with or without a hydrophilic end, which are located on the lower side of the plate. A further plate, ideally of the same size, made of the same material or a different material is fitted parallel to this plate, the spacing of the plates being greater than the thickness of the air-holding layer, for example from 0.1 mm to 30 mm greater, preferably from 1 mm to 15 mm greater. If the plates now lie horizontally and the intermediate space between the plates is filled with water, with or without a slight elevated or reduced pressure (typically up to 30 mbar above or below the ambient air pressure), the water does not fully fill the intermediate space between the plates: the air-holding layer remains on the upper side. Water may now be allowed to flow slowly, and the water enriched with salts (the brine) may be extracted on the other side. At the same time, air is pumped through the air-carrying layer above the water. If dry air is allowed to flow in, air with a higher humidity (in comparison with the air flowing in) is found to flow out because of the evaporation of the water. At the same time, the unit consisting of the two plates and the water layer and gas layer lying between them is cooled by the enthalpy of vaporization.

There are thus three effects:

(i) The air flowing through is enriched with the molecules of the evaporating liquid and, in the limiting case of slow flow, is saturated therewith. During cooling, the liquid recondenses, which may generally be used both for distillation, for instance in the chemical industry and in chemical process engineering, but also in the production of drinking water by desalination of seawater.

(ii) The unevaporable component, i.e. the minerals and salts, is concentrated in the water. The liquid reemerging from the cell may be used as a salt-rich brine in order to obtain them. One application involves the amounts of water obtained in the field of geothermal energy, for instance from sizeable depths, from which not only geothermal heat but also minerals and valuable dissolved substances may thus be obtained.

(iii) The apparatus cools itself, which allows the use in the form of a substantially passive, environmentally friendly cooling unit, not only in the field of power plants.

The apparatus cools itself, which allows the use in the form of a substantially passive, environmentally friendly cooling unit in the domestic sector in which, instead of energy-consuming cooling units, it is possible to change over to passive cooling units using the enthalpy of evaporation, for which reason the device according to the invention for the first time allows a compact configuration. In summer, hanging up a large number of wet towels also provides environmentally friendly cooling, albeit with the following disadvantages:

The towels always need to be wetted again.

The constantly newly evaporating water leads to formation of limescale and salt crusts, until the towels are unusable.

The evaporating water leads to an increase in the humidity in the living space up to an unhealthy and unbearable sultriness at 100% humidity. Sweating no longer lets people cool down and the risk of circulatory failure exists.

At the latest when 100% humidity is reached in the room, water no longer evaporates and the cooling effect of the wet towels ends.

It is thus necessary to ventilate the room constantly—which is counterproductive for living and office space cooling or for food spaces, storage spaces and computer spaces to be cooled during the day in summer, since heat then comes in from the outside at high external temperatures.

Added to this, the moisture generated by the evaporation may cause damage to buildings and damage to the contents (books, electronics, computers, etc.).

All these problems are solved by the device according to the invention:

New water is continuously supplied slowly in order to compensate for evaporation losses and the discharge of the brine at the outlet of the device.

Water is discharged continuously in order to discharge the water enriched with salts and minerals by the ongoing evaporation before salts precipitate.

In one preferred configuration, the salt concentration is monitored continuously—for instance by electrical conductivity measurements or cyclic voltammetry and the automated or manual evaluation thereof—and in this way the water supply and discharge are automatically regulated so that precipitation of salts does not take place in the system, and so that the water (brine) flowing out at the outlet has the desired salt concentration, which is highly advantageous particularly in the case of obtaining raw materials (salts, minerals) from the brine or in the case of the direct use of brine, for instance in medicine for therapeutic applications).

No increased humidity is created in the room. Damage to buildings and contents is likewise avoided, together with loss of comfort and health risks for persons due to the high humidity.

The brine is not lost, but may be used if desired.

In one advantageous configuration of the device, instead of just two parallel, preferably horizontally lying plates, between which there is a water-carrying layer (preferably underneath) and an air-carrying layer (preferably above), a plurality of such plates are used in layers above one another. The plate stack may in this case be arbitrarily thick. Two plates per layer are then no longer required. For each layer, a plate which contains a structured layer holding water on the lower side, and not on the upper side, is sufficient. If the spacing of neighboring layers in the stack is for example 1 cm, 100 square meters of water surface may be produced in a volume of 1 cubic meter. This raises the question of transporting the heat energy away. It can no longer be done sufficiently by cooling the surface. It is carried out in this case by circulation of the water. The cold water at the outlet is fed through a heat exchanger, which carries out the room cooling and then returns into the evaporation system through its inlet. This circuit, however, is here again not constantly closed, but rather, continuously or at intervals, the salt-rich water is removed and fresh water lower in salt is supplied in order to avoid scaling and salting of the system by precipitates. The air enriched with moisture is released to the outside and not to the room to be cooled. If the humidity of the room to be cooled is additionally intended to be regulated, a (small) part of the humid air may naturally also be fed (ideally in a regulated fashion) into the room in the scope of artificial humidification.

One very simple variant of the aforementioned device, which although it is distinguished by economical production, it is also distinguished by very low stability, particularly in the event of water pressure variations and air pressure variations, is the use of unstructured or arbitrarily structured plates having an arbitrary surface. In the case of plates that do not have a structured surface holding air under water, a hydrophilic lower side (on which the water layer bears) and a hydrophobic or superhydrophobic upper side (where the contact with the air layer takes place) is also an advantageous configuration of the device.

Furthermore, the present invention also relates to the use of the structured surface according to the invention on ship surfaces, in systems for the desalination of water or in systems for salt enrichment in salt production, as well as in cooling systems as compact, high-performance cooling units.

On ship surfaces, the structured surface according to the invention may in particular be used to contribute to (i) reducing the friction forces between the ship and the water, (ii) avoiding biofilm growth and fouling and (iii) avoiding corrosion, as well as (iv) avoiding the release of toxic or environmentally harmful substances from the ship coating into the surrounding water.

In systems for the desalination of water, the structured surface or device according to the invention may be used in particular to obtain service water and drinking water.

In systems for salt enrichment in salt production, the structured surface according to the invention may in particular be used by using multiple layer systems of gas and underlying liquid, the liquid evaporating into the gas layer and being removed therefrom as gas ("vapor") enriched or saturated with the molecules of the liquid. The same applies for use in desalination plants.

As described above, the structured surface according to the invention may likewise be used in cooling systems as compact, high-performance cooling units for the evaporation of water or another liquid while using the enthalpy of vaporization. This may preferably be in power plants.

As in the case of salt enrichment, a great advantage may be obtained here by using multiple layer systems of gas and underlying liquid, the liquid evaporating into the gas layer and being removed therefrom as gas ("vapor") enriched or saturated with the molecules of the liquid.

The invention claimed is:

1. A structured surface which comprises, on a liquid-facing side:
   (i) liquid-repelling structures that form a gas-holding layer, the liquid-repelling structures being projections or protruding elements, and which are configured to at least temporarily hold a gas layer under the liquid;
   (ii) fluid-impermeable walls defining a multiplicity of self-contained compartments on at least a portion of the structured surface, the self-contained compartments including the liquid-repelling structures, wherein the walls have upper ends facing the liquid and a height, and wherein at least a portion of the walls are oriented parallel to a flow direction of the liquid and a remaining portion of the walls are not oriented parallel to the flow direction of the liquid; and
   (iii) rib structures positioned on the upper ends of the walls oriented parallel to the flow direction of the liquid and extending in the height direction from the upper ends of the walls oriented parallel to the flow direction of the liquid relative to the height of the walls not oriented parallel to the flow direction of the liquid, wherein the rib structures are parallel to the flow direction of the liquid, or parallel to a movement direction of the structured surface relative to the liquid, and wherein the rib structures are configured to project at least temporarily 0.1 µm to 10 mm from the gas layer into the liquid.

2. The structured surface as claimed in claim 1, wherein the structured surface is further combined with a device that, under the liquid, generates gas bubbles which are generated close to the gas layer, held under the liquid, of the structured surface or which, when they rise from the liquid, come close to the gas layer or in partial contact therewith.

3. The structured surface as claimed in claim 2, wherein the gas bubbles generated have a diameter ranging from 10 µm to 10 mm.

4. The structured surface as claimed in claim 2, wherein the structured surface further comprises second structures protruding from the gas layer, which project into the liquid so that gas from the gas bubbles moving past is trapped in order thereby to supply the gas layer with the gas or replenish lost gas.

5. The structured surface as claimed in claim 4, wherein the second structures protruding from the gas layer have the shape of hairs, hairs becoming thinner upward from the structured surface, columns, or webs.

6. The structured surface as claimed in claim 4, wherein the second structures protruding from the gas layer are resilient and stand upright in the absence of external forces, and they are additionally configured fully or partially by the wettability of their surface, at least in the part projecting into the liquid, in such a way that they have liquid-repellent properties, the resilient properties being adjusted in such a way that, in the event of partial or full loss of the gas layer, the structures automatically stand upright and project into the liquid, where because of their liquid-repellent layers they can trap gas bubbles which replenish the gas layer, and in such a way that as soon as a gas layer has been formed again, they are folded back into the gas layer because of their resilient properties and their liquid-repellent properties.

7. The structured surface as claimed in claim 4, wherein the second structures protruding from the gas layer are oriented, with respect to the flow direction of the liquid or the movement direction of the structured surface relative to the liquid, in such a way that they point obliquely rearward relative to the flow direction and/or are curved inward in this direction.

8. The structured surface as claimed in claim 1, wherein the material of the structured surface contains at least one of the list consisting of silicones, silicone-based polymers and acrylic-based polymers.

9. The structured surface as claimed in claim 1, wherein the rib structures consist of a different material than the structured surface itself.

10. The structured surface as claimed in claim 9, wherein the rib structures consist of a ceramic material, an oxide, or a metal.

11. The structured surface as claimed in claim 10, wherein the metal is steel.

12. The structured surface as claimed in claim 1, wherein the rib structures are not rigidly connected to the upper ends of the walls oriented parallel to the flow direction of the liquid, but are flexible and mobile or are connected thereto at least resiliently.

13. A device comprising at least one structured surface as claimed in claim 1, which is arranged between two plates and thereby forms a water layer and an air layer between the plates.

14. A method of using the device as claimed in claim 13 in systems for the desalination of water, in particular to obtain service water and drinking water, or in systems for salt enrichment in salt production, in particular by using multiple layers of gas and underlying liquid, the liquid evaporating into the gas-holding layer and being removed therefrom as gas ("vapor") enriched or saturated with the molecules of the liquid.

15. A method of using the device as claimed in claim 13 in cooling systems as compact, high-performance cooling units for the evaporation of water or another liquid while using the enthalpy of vaporization, preferably as cooling units in power plants, in particular by using multiple layers of gas and underlying liquid, the liquid evaporating into the gas layer and being removed therefrom as gas ("vapor") enriched or saturated with the molecules of the liquid.

16. A method of using the structured surface as claimed in claim 1 for ship surfaces, applying the structured surface onto a ship (i) to reduce the friction forces between the ship and the water, (ii) to avoid biofilm growth and fouling and (iii) to avoid corrosion, as well as (iv) to avoid release of toxic or environmentally harmful substances from the ship into the surrounding water.

17. A method of using the structured surface as claimed in claim 1 in systems for the desalination of water, in particular to obtain service water and drinking water, or in systems for salt enrichment in salt production, in particular by using multiple layers of gas and underlying liquid, the liquid evaporating into the gas layer and being removed therefrom as gas ("vapor") enriched or saturated with the molecules of the liquid.

18. A method of using the structured surface as claimed in claim 1 in cooling systems as compact, high-performance cooling units for the evaporation of water or another liquid while using the enthalpy of vaporization, preferably as cooling units in power plants, in particular by using multiple layers of gas and underlying liquid, the liquid evaporating into the gas layer and being removed therefrom as gas ("vapor") enriched or saturated with the molecules of the liquid.

* * * * *